(12) United States Patent
Erb et al.

(10) Patent No.: US 7,914,882 B2
(45) Date of Patent: Mar. 29, 2011

(54) FLAT SEALING MATERIAL IN THE FORM OF A REINFORCED COMPOSITE FILM

(75) Inventors: Wilfried Erb, Neu-Ulm (DE); Peter Übelmesser, Bayreuth (DE)

(73) Assignee: Frenzelit Werke GmbH, Bad Berneck (DE)

( * ) Notice: Subject to any disclaimer, the term of this patent is extended or adjusted under 35 U.S.C. 154(b) by 1089 days.

(21) Appl. No.: 10/575,212

(22) PCT Filed: Sep. 29, 2004

(86) PCT No.: PCT/EP2004/052360
§ 371 (c)(1),
(2), (4) Date: Jul. 7, 2006

(87) PCT Pub. No.: WO2005/037948
PCT Pub. Date: Apr. 28, 2005

(65) Prior Publication Data
US 2008/0248271 A1    Oct. 9, 2008

(30) Foreign Application Priority Data
Oct. 10, 2003 (DE) ................................. 103 47 080

(51) Int. Cl.
*B32B 7/02* (2006.01)
(52) U.S. Cl. ......................... 428/219; 428/212; 428/220
(58) Field of Classification Search .................. 428/212, 428/219, 220
See application file for complete search history.

(56) References Cited

U.S. PATENT DOCUMENTS

| 4,748,075 | A | * | 5/1988 | Beyer et al. | 428/221 |
| 7,144,622 | B1 | * | 12/2006 | Stecher et al. | 428/217 |
| 7,309,520 | B2 | * | 12/2007 | Kosack et al. | 428/221 |

FOREIGN PATENT DOCUMENTS

| DE | 33 32 255 A1 | 3/1984 |
| DE | 41 13 153 A1 | 10/1992 |
| DE | 41 16 800 A1 | 11/1992 |
| DE | 44 19 007 A1 | 1/1996 |
| DE | 197 35 390 A1 | 2/1999 |
| DE | 199 41 410 A1 | 3/2001 |
| DE | 101 14 554 A1 | 9/2002 |
| DE | 101 28 346 A1 | 3/2003 |
| EP | 1 006 237 A | 6/2000 |
| EP | 0 774 343 B | 2/2003 |

* cited by examiner

*Primary Examiner* — Mark Ruthkosky
*Assistant Examiner* — Lawrence D Ferguson
(74) *Attorney, Agent, or Firm* — John B Hardaway, III; Nexsen Pruet, LLC

(57) ABSTRACT

The invention relates to a stable high-performance flat sealing material for application at a temperature up to 330° C. which is compacted by heat and pressure in such a way that a composite film, i.e. a reinforced (fibrous) film is obtainable by compressing one or several non-woven fabrics or one or several non-woven mat weaves at a predetermined pressure and temperature. The inventive flat sealing material is suitable for highly stressed joints, in particular for cylinder head gaskets. The thus produced composite film or the (fiber and/or binder) reinforced film has the layer thicknesses ranging from 0.01 to 3.0 mm obtainable in one operation from one or several non-woven fabric layers, thereby making it possible for the first time to obtain the layer thicknesses of 0.01 mm using the inventive materials.

28 Claims, 10 Drawing Sheets

FLAT SEALING MATERIAL IN THE FORM OF A REINFORCED COMPOSITE FILM

The present invention relates to a high-performance flat sealing material which is thermally stable under application conditions of up to 330° C. and is consolidated by pressing one more fibre webs or fibre mats under pressure and with heat to give a so-called composite film, i.e. to give a (fibre) reinforced film. The flat sealing material is suitable for use for seals under high stress and in particular for cylinder head gaskets. The composite film produced and the (fibre and/or binder) reinforced film have layer thicknesses of from 0.01 mm to 3 mm, which can be realised in one operation from one or more nonwoven layers. Thus, minimum layer thicknesses of 0.01 mm can be achieved for the first time using these materials according to the invention.

The present invention therefore also relates to seals, in particular cylinder head gaskets, which consist of the above-mentioned novel flat sealing material, which optionally may be applied to a sheet-like substrate. A metal substrate or a substrate comprising aluminium or an aluminium alloy may serve as the substrate. In particular embodiments of the invention, however a woven fabric, a knitted fabric, papers or (ceramic) sheets may also serve as the substrate. The flat sealing material may then have been arranged in a further embodiment between two substrates, for example two woven fabrics, and consolidated under pressure and at elevated temperature. In a further embodiment, a plurality of flat sealing materials applied to a substrate, for example a woven fabric, can also be stacked one on top of the other and consolidated under pressure and at elevated temperature. The seal then consists of a laminate comprising substrates and flat sealing material supported in between.

In the prior art, coatings in seals often serve not only for protecting the coated materials from media influences or the like but also for improving the sealing properties of the seal. For this purpose high adaptability of the coating to the opposite surfaces to be sealed must be created in order to compensate unevenness etc. Furthermore, the coating must at the same time have a certain resilience in order to compensate the dynamic vibrations of components. If it is not sufficiently provided by resilience of the sealing material or, in the case of metal seals, of the bead elements in the seal, the coating performs a decisive sealing function.

In the case of certain requirement profiles, good continuous sliding properties of the coating and little settling under the influence of pressure and heat are additionally required. Good continuous sliding properties are coupled with permanently stable surfaces having very little wear.

An example of a seal which should have both good continuous sliding properties and high adaptability to the opposite surfaces to be sealed is the cylinder head gasket. To date, cylinder head gaskets have usually been provided with a thin coating a few µm thick, which is said to improve the adaptability of the seal to unevenness and roughness of the opposite surfaces to be sealed, such as engine block and cylinder head. Such coatings are usually coatings comprising rubber which are applied in the case of metal seals to the metallic substrate and usually have a thickness of about 20 m. Such a structure, i.e. a metallic substrate provided with a fluorine rubber coating, is the current customary structure of a so-called MLS (multi-layer steel) cylinder head gasket. A major weakness of fluorine rubber coatings is the high coefficient of friction of the fluorine rubber coating relative to the sealing surfaces, the relatively low adhesion of the coating to the steel substrate, the relatively high dependence of the stability on the operating temperature and on the heat stability and the associated low resistance of the coating to wear.

DE 199 41 410 A1 describes a coating for application to a metal substrate, which coating comprises at least one thermoplastic fluorine plastic and the hardness of which decreases from the first layer intended for application to the substrate in the direction of the outermost coating layer remote from the substrate. The hardness gradient can be achieved by addition of fillers or reinforcing substances or by addition of at least one thermoplastic.

The coating process described in DE 199 41 410 A1 leads to the commercially available cylinder head gaskets with the designation "Monomet®", which are now available for all engine types, e.g. open deck, closed deck, petrol, diesel, aluminium and gray cast iron. The "Monomet®" cylinder head gasket comprising steel or aluminium results in significantly reduced oil consumptions particularly in the case of engines for extreme requirements, and as so not only in the new state. The "Monomet®" cylinder head gasket can, however, also be provided with a durable multilayer plastic powder coating which substantially retains its properties under extreme loads. With this "multi-slide" (powder) coating of in particular a cylinder head gasket, however, applications should be possible which were previously barred to the use of durable plastic coatings. It combines the positive properties of the PEEK polymer with those of PTFE. The material PEEK ensures high stability, good resistance to wear, relatively high thermal stability and low sliding friction.

As stated, the "multi-slide" coating was first developed for the metal cylinder head gaskets, such as, for example, "Monomet®". This is of key importance both for the sealing function and for the running properties of the engine. In the "multi-slide" process, a multilayer coating of different plastics is applied as powder and then sintered.

However, a minimum total layer thickness of the "multi-slide" coating of about 60 µm is achieved overall by this technique. The adaptability of the "multi-slide" coating is achieved by a high proportion of PTFE or PFA. Good adhesion of the coating to the substrate is achieved by a high proportion of a high-temperature thermoplastic, such as, for example, PEEK.

However, it is also desirable, as already discussed in DE 199 41 410 A1, to achieve a transition, i.e. a gradient from a high PEEK proportion to a high fluorine thermoplastic proportion. This is achieved by a multilayer structure of, for example, ten layers ("multi-slide"). In the case of a total thickness of the coating of about 60 µm, however, this means an individual layer thickness of about 6 µm.

Fibre reinforcement of the "multi-slide" coatings described above is not conceivable in practice because customary fibre diameters are in the region of 7 µm, for example in the case of carbon fibres, and in the range of from 6 to 9 µm in the case of glass fibres. Organic fibres are as a rule substantially thicker and have diameters of from 12 to 25 µm. However, the individual layer thickness can, as already stated above, be only 6 µm. Furthermore, it should be borne in mind that each individual layer is individually "sintered" or consolidated in the "multi-slide" process described above. However, the melting of the PEEK powder at 380° C. leads to considerable stress on the polymer and in some cases even to degradation.

In general, the "multi-slide" coating as a combination of the materials PEEK with PTFE is therefore certainly a new approach for counteracting the increasing temperatures and the higher performance density of modern engines. In order actually to meet these higher requirements with regard to the sealing material and to effect economical production, however, a product which has better properties and lower process costs than the "multi-slide" process is required.

The prior art describes nonwoven production by the wet process in typical procedures derived from papermaking. In "Vliesstoffe" [Nonwovens], Wiley-VCH, Wiley-VCH-Verlag, Weinheim, 2000 from page 235 et seq., such a process is described. The process is carried out in such a way that the fibres are dispersed in water, continuous formation of a nonwoven on a belt sieve by filtration is then effected and consolidation, drying and rolling up of the resulting nonwoven sheet are then carried out.

Such processes are used substantially for papermaking, such as, for example, in the case of manmade fibre paper, teabag paper, air filter paper or in cigarette papers.

The process of the prior art is therefore used only for the production of special papers or special technical nonwovens as an end product.

EP 774 343 B1 furthermore discloses shaped articles, in particular for use as interior trim in vehicles, which have been formed from molten fibres and reinforcing fibres. EP 774 343 B1 discloses a shaped article which consists of a core layer and a sort of top layer, the core layer having been formed from molten fibres and reinforcing fibres in an appropriate press tool with provision of heat and pressure. The molten fibres may be formed from ethylene, polyethylene, polyamide, polypropylene, polyvinyl chloride, polystyrene, polyamide or another thermoplastic material or combination of these materials. The reinforcing fibre may be plastic, natural, glass or metal fibres or a combination of these fibres. The shaped article disclosed in EP 774 343 B1 is, however, suitable only for interior trims of vehicles, for example as side trims, rear shelves or the like, and has inadequate properties with respect to density and strength and is therefore limited in applicability to the abovementioned applications.

DE 41 16 800 A1 describes a high-temperature process for the production of sheet-like composite materials having a thermoplastic matrix, the reinforcing fibre structure and the thermoplastics being fed to a press, the temperature of the materials being increased in this press and the reinforcing fibre structure being impregnated in a short residence time with an exactly defined maximum residence time of the individual volume element with application of pressure and high temperature and an unusually high temperature level being employed, which, as experience shows, otherwise leads to damage to the thermoplastic itself or to the sizes on the surface of the reinforcing fibres or to damage by degradation of the thermoplastic in the boundary layer to the fibres under the influence of the sizes.

DE 101 14 554 A1 describes a process for the production of a thermoplastically deformable, fibre-reinforced semifinished product based on polyetherimides. The invention relates to a continuous process for the production of thermoplastically deformable semifinished product from a polyetherimide and reinforcing fibres. It comprises the following steps:
  A. PEI fibres and reinforcing fibres are dry-blended to give a blended nonwoven,
  B. the blended nonwoven is consolidated by needle-punching,
  C. the consolidated blended nonwoven is heated and
  D. compressed to give the semifinished product.

DE 101 28 346 A1 describes a flat seal and a method for its production, the flat seal consisting of at least one nonwoven layer which consists of a sheet-like structure of asbestos-free fibres or fibre mixtures and is impregnated with a polymer, the sealing element consisting at least of a nonwoven impregnated with polytetrafluoroethylene.

DE 44 19 007 C2 describes a process for the production of an impregnated flat seal from a fibrous prepreg, in which a consolidated sheet-like fibrous structure is impregnated with precrosslinkable solutions, dispersions or suspensions of a reactive polymer blend, the precrosslinking thereof is then initiated by drying at elevated temperature and lastly the polymers in the resulting prepreg sealing web(s) is or are finally crosslinked under pressure and at elevated temperature, optionally together with a metallic reinforcement, characterized in that at least one nonwoven fabric consolidated with binder and consisting of asbestos-free fibres of organic or inorganic origin, in the form of a web, is impregnated with the precrosslinkable polymer blend, the impregnated fibre web(s) is or are then allowed to run through two squeeze rolls, the solvent, dispersing medium or suspending medium is then removed in a drying oven until dryness and precrosslinking of the polymer blends are obtained, the resulting nonwoven prepreg webs are then laminated with and bonded to one another in the desired number under pressure and under the action of heat which is sufficient to effect the final crosslinking of the polymers to give the sealing material which is followed by the punching out of the final seal.

Finally, DE 32 32 255 A1 describes an asbestos-free soft flat sealing material, i.e. one produced using asbestos substitutes, in particular for the production of flat seals under high stress. It consists of a fibre web comprising at least three different fibre types and fillers and binders. The fibre web contains altogether from 15 to 60% of fibres with from 5 to 40% of organic manmade fibres, from 5 to 25% of natural fibres and from 35 to 90% of mineral or metal fibres and from 3 to 15% of binder and from 30 to 70% of mineral filler. The combination of the various fibre types and fillers with their different properties results overall in a material whose technological properties overall correspond to those of asbestos materials. By using the fibre types and fillers in the ratios according to the invention, it is easy to produce the fibre webs with the desired porosity, compaction and compressibility. Impregnated, asbestos-free flat seals having a high load capacity can thus be produced from the fibre webs for use in particular in internal combustion engines. The binder-rubber systems used in DE 32 32 255 A1 are, however, thermally stable only up to maximum application conditions of 200° C. which constitutes a major disadvantage.

It is therefore the object of the present invention to provide a high-performance flat sealing material which is thermally stable under application conditions up to 330° C. and has high strength, good damping properties, excellent sliding and wear properties and adjustable density and which is suitable for sealing applications and in particular cylinder head sealing applications.

The above object is achieved by the high-performance flat sealing material, thermally stable under application conditions up to 330° C., in the form of a fibre- and/or binder-reinforced composite film. The composite film according to the invention has a total layer thickness of from 0.01 mm to 3 mm and can be produced by pressing at least one or more fibre webs under pressure and with heat.

The fibre webs contain the following components:
  (a) at least one first fibre comprising a thermoplastic, selected from the group consisting of polyether ether ketone (PEEK), poly-p-phenylene sulphide (PPS), polyetherimide (PEI), polyetheramide (PEA), polyamide (PA), polysulphone (PSU), polyvinyl ether sulphone (PPSU), polyether sulphone (PES), polyaryl ether ketone (PAEK), polyether ketone (PEK), polyoxymethylene (POM) and mixtures thereof, as molten fibres, in a proportion by weight of from 30 to 97%, based on the total formulation of the fibre web, (b) optionally at least one second reinforcing fibre, selected from the group consisting of glass fibres, aramid fibres, carbon fibres, ceramic fibres, oxidised polyphenylene sulphide ($PPSO_2$) fibres, metal fibres, polyimide fibres, polybenzimidazole fibres, polybenzoxazole fibres and natural fibres and mixtures thereof, the thermal stability of which is greater than that of the molten fibres, in a proportion by weight from 3 to 67%, based on the total formulation of the fibre web, with the proviso that the average fibre length distribution of the molten fibres is smaller than that of the reinforcing fibres, (c) up to 60 percent by weight, in particular from 3 to 10% by weight, of a binder, based on the total formulation of the fibre web, the components (a), (b) and (c) summing in each case to 100% by weight.

Furthermore, the fibre webs may contain from 0.1 to 80 parts by weight of customary additives and compounding materials, in addition to the 100% by weight of the components (a), (b) and (c).

The additives (d) may be present in the form of powders or fibres or fibrids. In a particular embodiment of the invention, additives in the form of fibrids are used.

It is possible for the first time according to the invention to realise long fibre-reinforced films (composite films) or to realise these as coatings on substrates for use as a flat seal, and in particular as a cylinder head gasket, in one operation in layer thicknesses of from 0.01 mm to 3 mm, comprising at least one nonwoven layer.

The flat sealing material according to the invention, in the form of a fibre- and/or binder-reinforced film, can be produced by pressing at least one fibre mat under pressure and at elevated temperature. The pressing process can be effected batchwise or continuously. According to the invention, pressing can be effected under a pressure of from 0.05 to 15 $N/mm^2$ and at a temperature of up to 450° C., i.e. a temperature which is above the melting point or the softening point of the molten fibres. The pressing times are from 0.1 to 15 minutes.

According to the invention, a fibre-reinforced film having a minimum thickness of 0.01 mm can be produced for the first time by the use of high-precision starting nonwovens, in particular from PEEK or PPS comprising carbon fibres or glass fibres or organic high-performance fibres and also fibrous additives in different mixing ratios, proportions of reinforcing fibres and fibre lengths of at least 0.01-30 mm. In one embodiment, the consolidation of the nonwovens can also be effected directly on a substrate, in particular a steel substrate or a substrate comprising aluminium or an aluminium alloy. Woven fabrics, knitted fabrics, papers or ceramic sheets may serve as further preferred substrates. In an embodiment of the invention, the fibre web is consolidated on a woven fabric or is introduced between two woven fabrics and consolidated. This is a process whereby nonwovens are applied directly to the substrate and pressed, for example in cycle presses or double steel belt presses, and the flat sealing material according to the invention is produced. The heated presses permit both a continuous and a batchwise production method for flat sealing materials or individual seals. The fibre mats comprising the respective material can be applied in succession to the substrate and consolidated. Thus, it is possible to combine different materials with one another and in this way to produce a gradient material.

In a particular embodiment, it is furthermore possible, as already described above, to introduce the fibre- and/or binder-reinforced composite film between two woven fabric substrates. If a plurality of composite films applied to a woven fabric substrate are now consolidated one on top of the other under heat and pressure, a flat composite sealing material having a plurality of interspersed substrates and composite films is obtained.

According to the invention, the flat sealing material is produced by pressing at least one or more fibre mats, also consisting of different materials, in a heated mould under pressure, in particular under a pressure of from 0.05 to 15 $N/mm^3$. The fibre mats contain at least one first fibre of a high-performance thermoplastic or a metallic fibre as molten fibres in a proportion by weight of from 30 to 90% and at least one second reinforcing fibre of a high-performance material whose thermal stability is greater than that of the molten fibres, in a proportion by weight of from 10 to 70%, and from 0 to 60% by weight, in particular from 3 to 10% by weight, of a binder, the proportions of the total formulation of the fibre mat being based on weight, with the proviso that the fibre length of the molten fibres in the average frequency distribution is smaller than that of the reinforcing fibres.

Because the average distribution of the fibre length of the molten fibres is smaller than that of the reinforcing fibres, homogeneous mixing of the two fibre types is achieved so that, when the semifinished product is subsequently further processed a uniform homogeneous distribution of the reinforcing fibres in the fibre composite is obtained. The orientation of the fibres in the layer may be isotropic or anisotropic.

In the case of the flat sealing material according to the invention, it is therefore preferable if the molten fibre is from 0.1 mm to 30 mm, preferably from 2 mm to 6 mm and very particularly preferably from 1.5 mm to 3 mm long. The reinforcing fibres of the high-performance material may likewise have a length of from 0.1 mm to 30 mm but are, as defined by patent claim 1, in each case always larger than the molten fibres in their average fibre distribution. Suitable fibre lengths for the reinforcing fibres are from 0.1 mm to 18 mm, particularly preferably from 3 mm to 12 mm.

From the point of view of the material, the invention comprises, with respect to the molten fibre (a) all fibres which are known in the prior art and can be produced from a high performance thermoplastic. Examples of such fibres are polyether ether ketone (PEEK), poly-p-phenylene sulphide (PPS), polyetherimide (PEI), polyetheramide (PEA), polyamide (PA), polysulphone (PSU), polyvinyl ether sulphone (PPSU), polyether sulphone (PES), polyaryl ether ketone (PAEK), polyether ketone (PEK), polyoxymethylene (POM) and blends thereof. However, it is of course also possible in principle to use metallic fibres, for example comprising zinc, lead, bismuth or the alloys thereof, as molten fibres. The only precondition is that the melting point or softening point of the metal fibre is below 450° C.

In the case of the reinforcing fibres (b), it is possible to use those which can be produced from high-performance materials. Examples of these are fibres comprising polybenzoxazole (PBO), polyimide (PI), polybenzimidazole (PBI), oxidized polyphenylene sulphide ($PPSO_2$) fibres, metal fibres, glass fibres, aramid fibres, carbon fibres, ceramic fibres, natural fibres and/or mixtures thereof.

As already explained above, the fibre mat used according to the invention has a composition such that the individual fibres are fixed to one another with the aid of a binder. The fibres themselves are present in the form in which they have been used and are merely bonded to one another by the binder. This composition of the fibre mat is important since spreading apart of the reinforcing fibres and/or inhomogenous mixing must be avoided for the composite material subsequently to be produced.

According to the present invention, it is possible in the case of the binders (c) to use those based on polyvinyl alcohol (PVA), polyvinyl acetate (PVAC), ethylene/vinyl acetate (EVA), polyacrylate, polyurethane (PU), polyaramid, resins from the group consisting of melamine resin or phenol resin, polyolefins, such as polyethylene (PE), polypropylene (PP) and copolymers thereof.

In the context of the present invention, aramid fibres are understood as meaning those according to DIN 60 001 part 3 (1988) i.e. manmade fibres of synthetic polymers having aromatic chain members, at least 85% by mass of which are linked directly by aramid groups to linear macromolecules and in which up to 50% of the amide bonds may be replaced by imide bonds (c.f. Chemiefasern/Textilindustrie [Manmade fibres/Textile industry] vol. 39/91, December 1989, 1263, 1264).

The binder (c) may be a dispersion and have a fibrous film-like, fibril-like or fibrid-like character. Fibrids are understood as meaning short, highly split, nonspinnable fibres having very large surface areas. For example, those comprising polyolefins (PP, HDPE) may be used and may serve as binding fibres, for example for replacing phenol resin (regarding the definition of the fibrids, we refer to P. Steinau CTI 40/92 (1990) T. 152/53; S. Oberhoffner, Technische Textilien [Technical textiles] 39 (1996) 57/58).

The fibre mat used according to the invention can of course also contain additives (d). Such additives can be used for influencing the properties of the fibre mat and hence also subsequently the fibre composite material produced with the fibre mat. According to the present invention, it is therefore possible to use additives which influence properties such as electrical conductivity, thermal conductivity, friction behaviour, thermal stability, impact strength, strength or abrasion resistance. Such additives may also be used, for example, in the form of fibres, fibrils, fibrids, films or pulps. The additives may be both metallic or ceramic and organic powders.

What is important is that the fibre mat used according to the invention has a very low weight per unit area. Also characteristic is the high uniformity of the sheet-like structure in the longitudinal and transverse directions with regard to the thickness and fibre distribution. Depending on reinforcing fibres and molten fibres used and the proportions by weight thereof, the fibre mats may have a weight per unit area of from 8 to 400 g/m$^2$, preferably from 50 to 100 g/m$^2$ and a density of from 30 to 500 kg/m$^3$ for organic fibres, preferably from 100 to 200 kg/m$^3$. For the use of metallic fibres, the above mentioned density can be far exceeded. The fibre mat used (as a precursor to the composite film) is preferably from 0.1 mm to 30 mm, particularly preferably from 0.15 mm to 1 mm, thick. The low mass per unit area with great homogeneity makes it possible to produce very thin films, including long fibre-reinforced films (composite films), in the subsequent pressing process.

The fibre mat used for the production of the flat sealing material may furthermore have a structure such that a sheet-like substrate is applied to at least one outer side of the fibre mat. The fibre mat then forms a functional layer therewith in the further processing, i.e. if the semifinished product is processed to give an end product, this functional layer performs certain functions, such as conductivity or a special adhesive function. The sheet-like substrate may be in the form of a metal substrate, woven fabric, laid web, paper or nonwoven.

The invention furthermore relates to a process for the production of a fibre mat as described above. The process according to the invention envisages that the molten fibres and the reinforcing fibres are dispersed in a dispersing medium, preferably water, and that continuous formation of a nonwoven on a belt screen by filtration is then effected and thereafter consolidation and drying of the nonwoven are effected. The binder may be added during the dispersing step and/or during the formation of the nonwoven.

It is also possible to add the additives during the dispersing step or during the formation of the nonwoven.

According to the invention, it is possible to obtain a flat sealing material whose density and thickness can be controlled both by the density and thickness and by the formulation of the nonwovens used as well as by the pressing (consolidation) parameters. It is therefore now possible to produce fibre composite materials having a density which is from 0.25 to 6 g/cm$^3$. The thickness of the fibre-reinforced film produced according to the invention is in the range from 0.01 to 3 mm. By the choice of the formation of the nonwoven, by a suitable choice of the process parameters, it is possible to produce a graded nonwoven, i.e. transitions from a high proportion of, for example, PEEK to a high proportion of reinforcing fibres, both in a single layer structure and in a multilayer structure can be achieved. A continuous change of concentration from highly adhesive PEEK to an optimally fibre-reinforced (long fibre-reinforced) thermoplastic compound is thus possible.

A concentration gradient of, for example, PEEK or PTFE can also be produced by simply placing nonwoven layers having different concentrations of the various components of the mixture one on top of the other. The fibrous surface and structure of the individual nonwoven layers helps to ensure an intimate bond (intermeshing) between the consolidated layers. Layer separation (delamination) can thus be avoided. This moreover leads to a substantially reduced tendency to creep between the layers and hence to higher stability.

By the choice of the different nonwovens comprising different materials, such as, for example, PEEK or PTFE etc. it is possible to produce a fibre composite material having targeted inhomogeneity in cross-section, i.e. a gradient material which is then also present in the final seal.

Owing to the free selectability and the mass per unit area of the starting nonwovens which is reproducible within narrow limits, minimum layer thicknesses of about 0.01 mm can be realised in the consolidated state in one operation from a nonwoven layer; greater layer thicknesses are achievable to a virtually unlimited extent by a higher weight per unit area of the individual nonwoven layer or by placing a plurality of the individual nonwoven layers one on top of the other.

The consolidation is thus effected in one step; repeated thermal loading of the high-temperature polymer is thus avoided.

The long fibre reinforcement leads to an adjustable and exactly definable modulus of elasticity, to the optimization of strength, damping, wear behaviour, coefficient of friction, adaptability, resilience and creep and flow properties of the metal-plastic composite and hence of the composite film.

Moreover, the above-mentioned properties are also influenced by the type of additives. In the context of the invention, additives are both binder systems and further fibre, powder or nanoscale compounding materials, including those from the group consisting of the traditional lubricants and sliding bearing materials.

Additives may furthermore be microspheres (hollow microspheres) which can lead to density and hence the compressibility being established in a targeted manner (cf. Claim 7). The hollow microspheres are in particular inorganic hollow microsphere having an average particle size of from 10 to 300 μm and a compressive strength of from 3.5 to 70 MPa, in particular a compressive strength of about 40 MPa.

According to the invention, the additives mentioned may also be applied in a separate operation, for example spraying, gravure printing or screen printing and hence in a localised manner to the composite film. The porosity and hence the density and compressibility of the end product (composite film) are controllable and reproducible by means of consolidation parameters and formulation. This too influences in particular properties such as the adaptability of the total system. The consolidation can lead in a continuous process to homogeneous densities or by means of structured pressing surfaces to any desired topographical surfaces and hence to locally different density (and hence compressibility).

The invention therefore also relates to a seal which is produced from the flat sealing material described above and, in a particular embodiment, is applied to a sheet-like substrate, in particular a steel substrate. The seal according to the invention can have a thickness differing from place to place or topographic surface differing from place to place, i.e. a thickness. It therefore has a density differing from place to place and hence a resilience and plasticity differing from place to place. This different resilience and plasticity can be achieved firstly through the choice of the different fibre mats from which the sealing material is produced but also by partial sectoral pressing, i.e. pressing differing from place to place (cf. in this context FIG. 6 to FIG. 9 further below).

As already mentioned above, different resilience and plasticity can be established by different fibre and filler contents within the sealing surfaces. In a particular embodiment of the invention, this different resilience and plasticity may be distributed over the sealing surface and can be achieved by mosaic-like assembly of materials of different plasticity and resilience (cf. FIG. 4 to FIG. 7 and FIG. 10 and FIG. 11 further below).

In another embodiment, the seal according to the invention may also contain inserted elastomer parts, ceramic material and also metallic materials. These are bead rings, laid-on or inserted sheet metal rings, sheet metal rings without beading, sintered or unsintered metal rings or flanged or unflanged borders.

In another embodiment of the invention, it is possible for the locally established different resilience and plasticity, which is achieved by compression pressures differing from place to place, to be characterized not by sharp transitions but by fluid transitions (cf. Claims 15 to 18).

In another embodiment the seal may have a seal geometry produced by moulding. The seal may have any known seal geometry as already used today, for example, for elastomer seals, for beaded metal seals or for unsupported seals (cf. FIGS. 10-15).

In a further embodiment the sealing geometry produced by moulding may have a comb profile. Here, the seal has sealing surfaces arranged in series in a region. The sealing surfaces form a comb-like structure in section. Various versions of such comb profiles are shown, for example, in FIGS. 13-15.

The invention is described in more detail below with reference to examples and figures, without limiting it thereto.

FIGS. 11 to 15 show sectional views of the seal according to the invention, having different characteristics for moulding operations.

The sealing material according to the invention, having the unique sealing structure and the unique properties, is usually produced by nonwoven fabric production by a wet process in the typical procedure derived from papermaking. A sealing material is then produced from the fibre mats with application of pressure and heat and is then further processed to the final seal, in particular to a cylinder head gasket.

Figure 1:
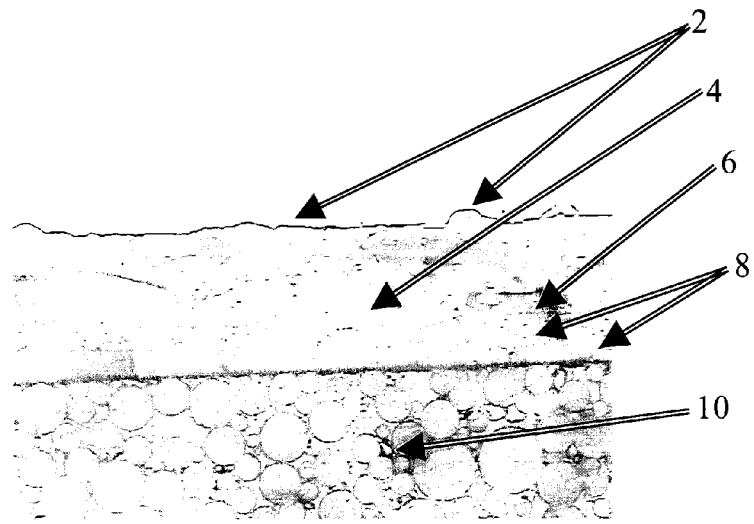
FIG. 1 shows a cross-section of a consolidated precision nonwoven according to the invention, comprising PEEK as molten fibres, consolidated on steel sheet, having a virtually optimum density and virtually no porosity.

FIG. 1 shows a transverse ground section of a consolidated precision nonwoven according to the invention, comprising PEEK as molten fibres consolidated onto steel sheet, having a virtually optimum density and virtually no porosity. The reference numeral 2 designates the boundary surface to a steel substrate. The high-performance thermoplastic 4 is applied to the steel substrate. Additives 6 are introduced into the high-performance thermoplastic 4. Carbon fibres 8 are also introduced into the high-performance thermoplastic 4. An embedding material 10 is also detectable at the lower edge of the sectional image.

Figure 2:
FIG. 2 shows a scanning electron micrograph (SEM) of a fracture pattern of a consolidated mat according to the invention, comprising PPS as molten fibre and carbon fibres as reinforcement, having a relatively high porosity and a density of 1.23 g/cm$^3$.

FIG. 2 shows a scanning electron micrograph (SEM) of a transverse ground section of a consolidated mat according to the invention, comprising PPSO$_2$ as molten fibres and carbon fibres as reinforcing fibres. The mat has relatively high porosity and a density of 1.23 g/cm$^3$. In the micrograph, the pores are characterized by the reference numeral 12. The E-glass reinforcing fibres are detectable at 14 and are embedded in the high-performance thermoplastic 16.

Figure 3:
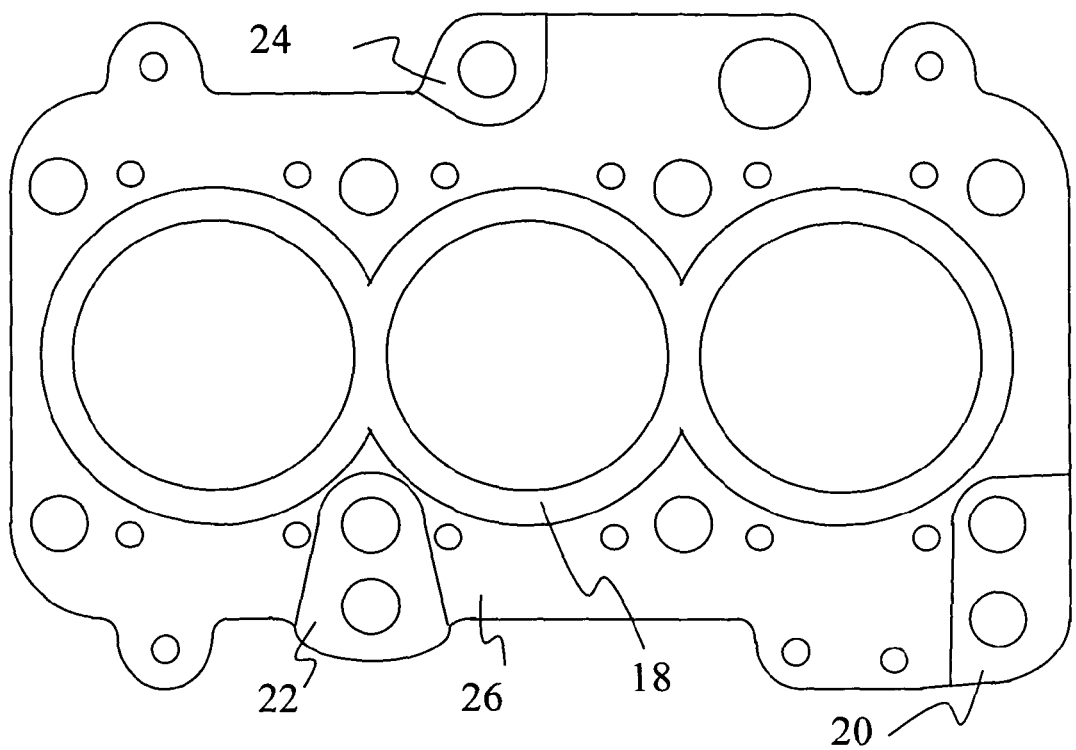
FIG. 3 shows a plan view of a cylinder head gasket according to the invention, which is formed from the flat sealing material according to the invention.

FIG. 3 shows, by way of example, a typical cylinder head gasket according to the invention in plan view, which is formed from the flat sealing material according to the invention. The reference numeral 18 indicates a zone of higher density and higher spring stiffness and low compressibility.

The zone which is designated with reference numeral 26 has a lower density than the zone 18, lower spring stiffness and higher compressibility and higher resilience.

The zones 20, 22 and 24 in FIG. 3 have a medium density and medium spring stiffness, medium compressibility and medium resilience.

In FIGS. 4 to 7, reference numerals 30, 32 and 34 designate different regions of the seal according to the invention, which is achieved by the mosaic-like assembly of the respective materials, 30, 32 and 34.

Figure 4:
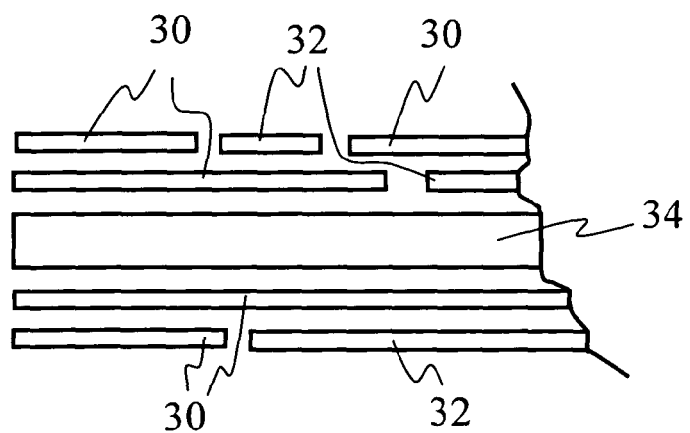
FIGS. 4 to 7 and 10 to 11 show sectional views of different embodiments of seals according to the invention, in which different resilience and plasticity are achieved by mosaic-like assembly of materials.

FIG. 4 shows a layer structure of a seal on a substrate 34. Layers 30, 32 having different densities, moduli of elasticity and resilience properties are shown on the substrate 34. A number of layers assembled in each case in a mosaic-like manner are placed one on top of the other on the continuous substrate 34. As a result, any desired design of a seal can be obtained. The seal of the present invention is not reliant on a substrate layer 34. The seal of the present invention is also not limited to a certain number of different layers 30, 32. Here and below, it may be assumed that the layer 30 is a layer having a high density and that the layer 32 is a layer having a lower density. The diagram in FIG. 4 shows the nesting principle in mosaic form before the consolidation of the nonwovens. In FIG. 4, the mosaic is clearly evident both in plan view (not shown) and in sectional view.

Figure 5:
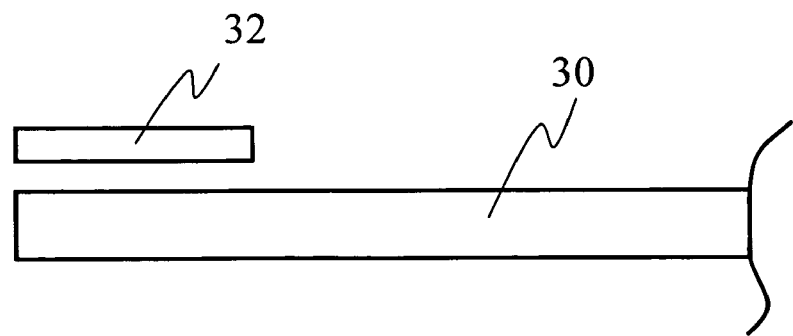

In FIG. 5, the seal is limited to two sealing layers 32 and 30, the sealing layer 32 being mounted on the continuous sealing layer 30. The diagram in FIG. 5 shows simple laying on prior to the consolidation of the nonwovens. In FIG. 5, a mosaic-like structure is evident only in plan view (not shown).

Figure 6:
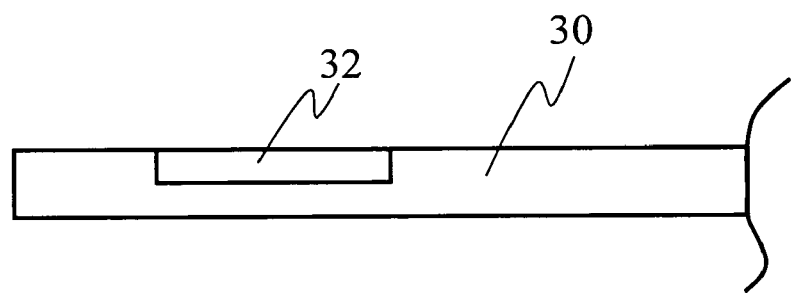

In FIG. 6, the seal is likewise limited to two sealing layers 32 and 30. The structure shown can be achieved by pressing the sealing structure shown in FIG. 5. The structure shown can also be produced by a mosaic-like assembly of the layers 30 and 32 on a layer 30 corresponding to FIG. 6.

Figure 7:
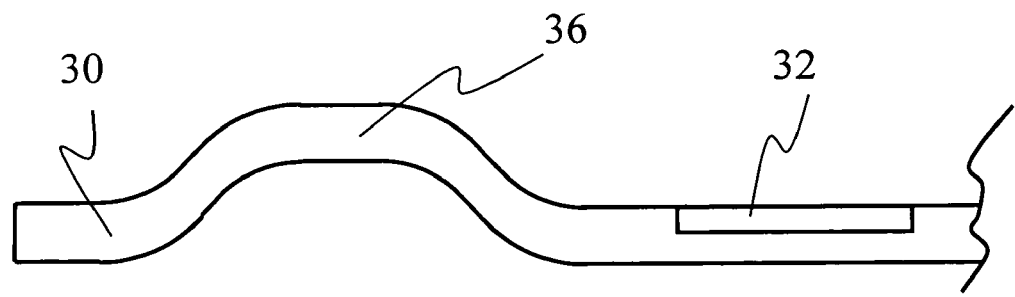

FIG. 7 shows substantially the sealing structure shown in FIG. 6, which is provided with a bead 36 in one region in order to achieve higher resilience.

Figure 8:
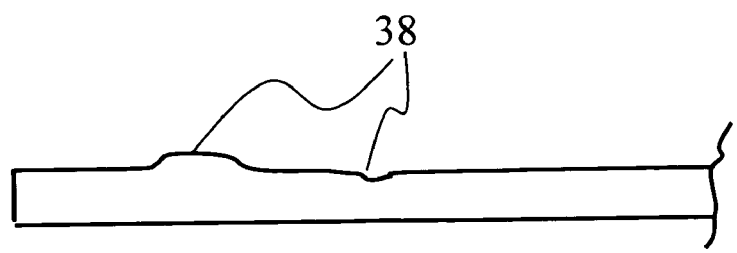
FIGS. 8 and 9 show a sectional view of a seal according to the invention, in which the different resiliencies and plasticity are achieved by topographically designed press plates or partial, sectoral pressing.
Figure 9:
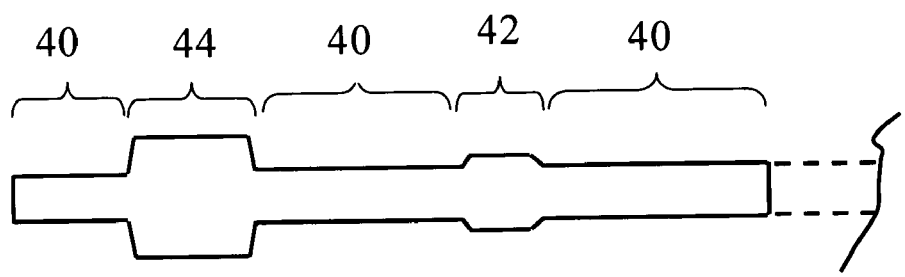

In FIGS. 8 and 9, the different topography of the seal according to the invention is achieved by sectoral pressing with compression pressures differing from place to place (cf. Claim 24).

Reference numeral 38 in FIG. 8 designates a topographic formation of the seal in order to obtain regions having different density and resilience.

In FIG. 9, the zones of higher resilience 44, zones of medium resilience 42 and zones of low resistance 40 are arranged by a topographical formation of the seal in order to produce a staggered density effect in the sealing plane.

Figure 10:
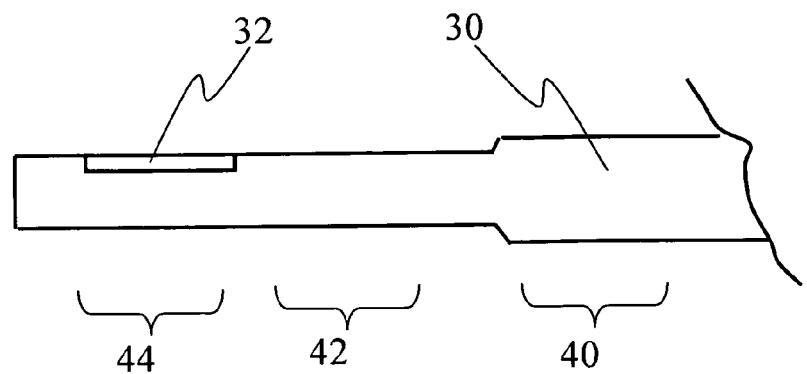
Figure 12:
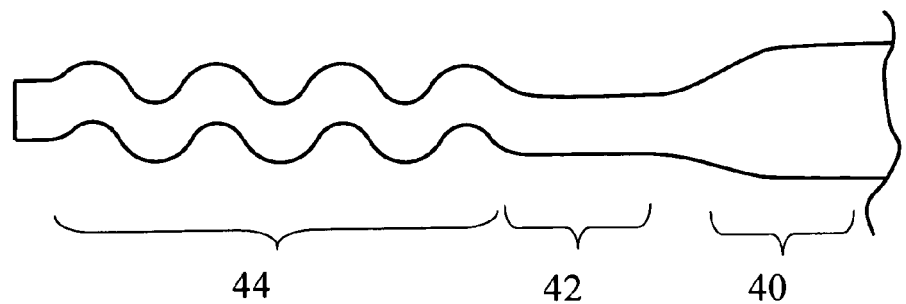

FIGS. 10 and 12 show combinations of a topographic formation and of a mosaic-like assembly of sealing materials.

Figure 11:
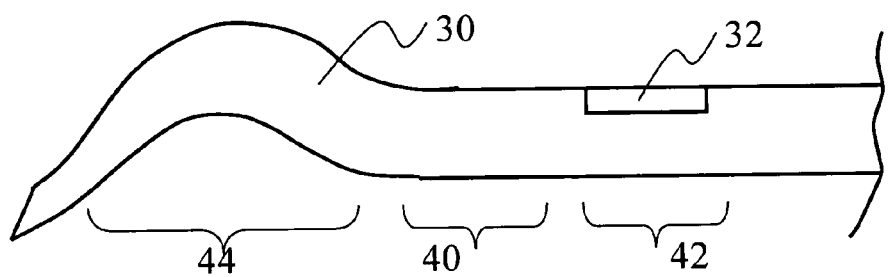

FIG. 11 shows a functional layer having a bead and a corresponding topographic formation and comprising a combination of sealing layers and nonwoven layers.

Figure 13:
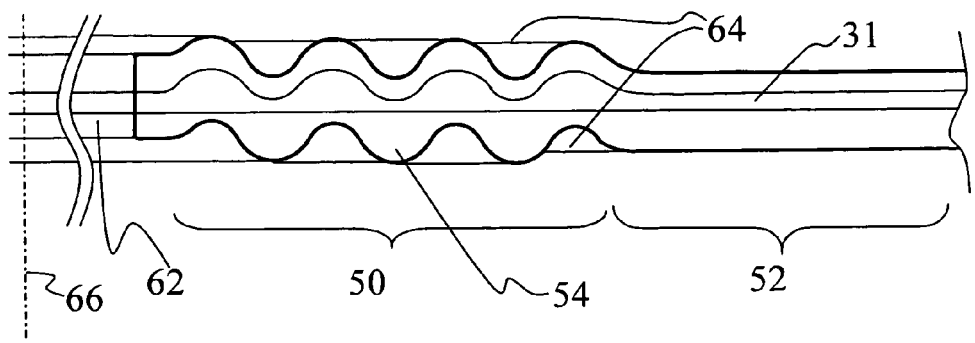
Figure 14:
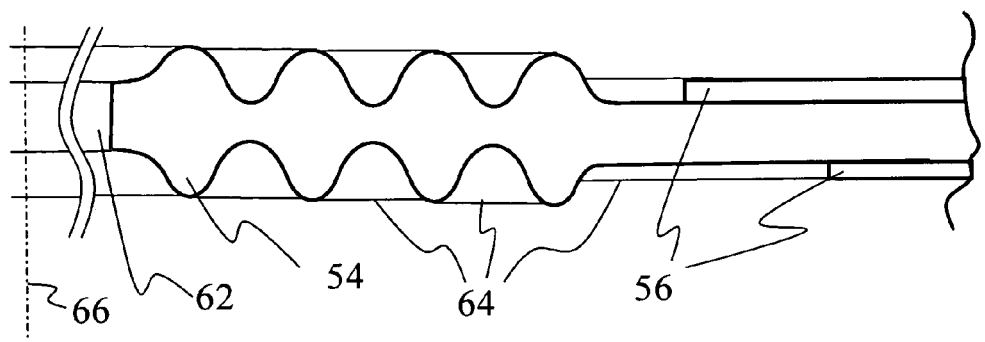
Figure 15:
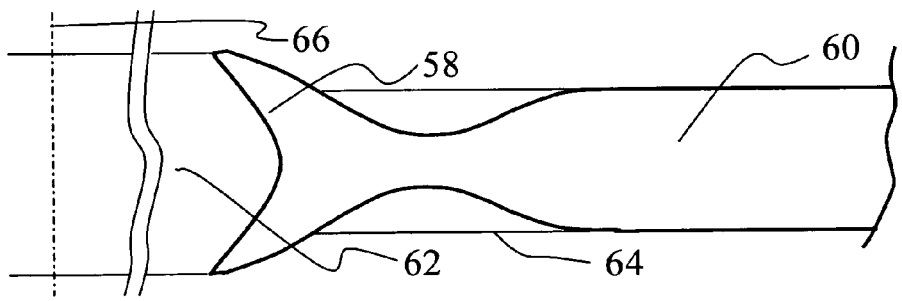

FIGS. 13 to 15 show sectional views of the seal according to the invention with different characteristics for mouldings.

FIG. 13 shows a sectional view of the seal according to the invention with a moulding in the form of a comb profile. The seal has an end face 62 which faces the cavity to be sealed. In a region adjacent to the end face 62, the seal is provided with a staggered comb profile 50. The staggered comb profile 50 has seal elevations 54 which are offset relative to one another on both sides of the seal. The transition from one series of successive full beads of FIG. 12 to a staggered comb profile 50 is fluid, it being possible for the staggered comb profile 50 to have structures which are smaller than the thickness of the seal. The lines 64 illustrate the continuation of the seal if it is assumed that it seals a gap or cavity which is circular about the axis 66. The seal shown in FIG. 13 furthermore has a steel sheet layer 31.

FIG. 14 shows a sectional view of a seal according to the invention, having a moulding in the form of a comb profile. Like the seal of FIG. 13, the seal has an end face 62 which faces the cavity to be sealed. In a region adjacent to the end face 62, the seal is provided with a comb profile which, in contrast to the seal of FIG. 13, is not offset. The comb profile has seal elevations 54 which are substantially one on top of the other on both sides of the seal. As in FIG. 13, the lines 64 illustrate the continuation of the seal if it is assumed that it seals a gap or cavity which is circular about the axis 66.

In FIG. 14, the seal is likewise shown with attached nonwoven layers 54 which can modify in a specific manner the sealing properties of the seal adjacent to the comb profile.

The seals of FIGS. 13 and 14 can also be provided with nonwoven layers which also extend into the region of the comb profile. It is also possible to build up the comb profile in the manner of a step pyramid comprising nonwoven layers placed one on top of the other. This multilayer structure can be combined with a moulding which has comb profile embodiments shown in FIGS. 13 and 14. The seal is designed so as to have successive sealing surfaces in one region. The sealing surfaces form a comb-like structure in section.

In FIG. 15, a functional layer is provided with a double sealing lip 58 by means of a moulding. The end face 62 is in the form of a double sealing lip 58. The sealing lips 58 are pressed, at an excess pressure applied to the surface 62, against the surfaces to be sealed (not shown), which reinforces the sealing effect thereof. As in FIGS. 13 and 14, the lines 64 illustrate the continuation of the seal which seals a gap or cavity which is circular about an axis 66.

In one embodiment, the seal according to the invention may also have inserted elastomer parts, ceramic materials and metallic materials. The seals may have bead rings, sheet metal rings placed on top or inserted, sheet metal rings without beading and flanged borders both on the inside and on the outside.

Figure 16:
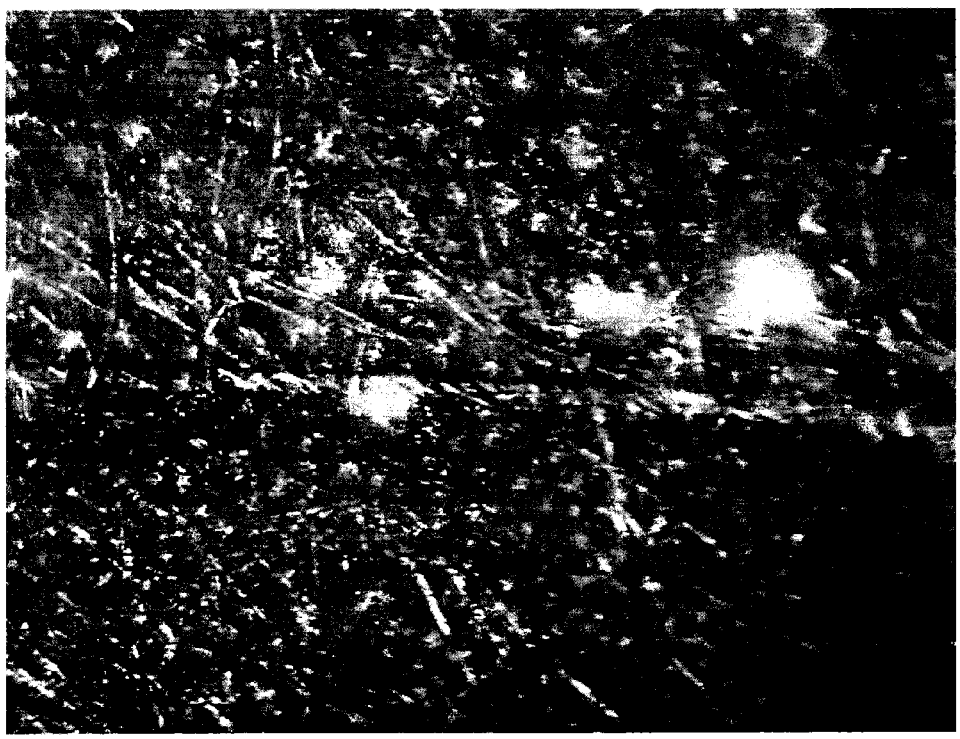
FIG. 16 shows a plan view of an HD variant (high-density variant) (100% density≈1.4 g/cm$^3$) of example 3 (according to the invention) (75% by weight of PEEK, 20% by weight of polyaramid fibre, 5% by weight of binder) (40× magnification, optical microscope).

FIG. 16 shows a plan view, under 40 times magnification (optical microscope), of the HD variant (100% density, i.e. 1.4 g/cm$^3$) of the material according to the invention, according to example 3, having the composition described below.

Figure 17:
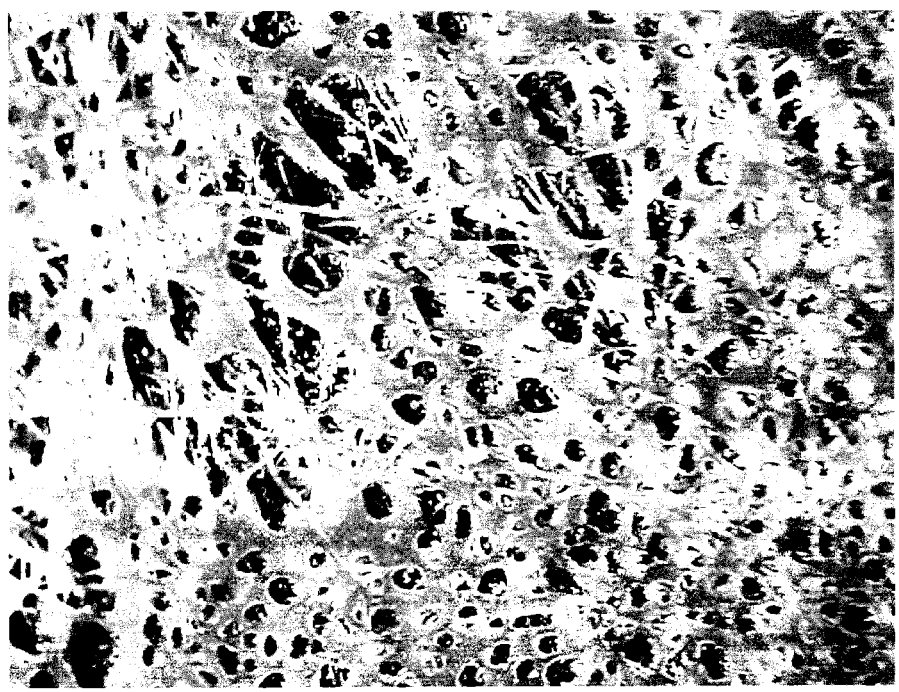
FIG. 17 shows a plan view of the flat sealing material according to the invention in the LD variant (low-density variant) (about 65% density, i.e. 0.9 g/cm$^3$) of example 3 (according to the invention) (75% by weight of PEEK, 20% by weight of polyaramid fibre, 5% by weight of binder) (40× magnification, optical microscope).

FIG. 17 shows a plan view, under 40 times magnification (optical microscope), of the LD variant (65% density, i.e. 0.9 g/cm$^3$) of the material of example 3.

Figure 18:
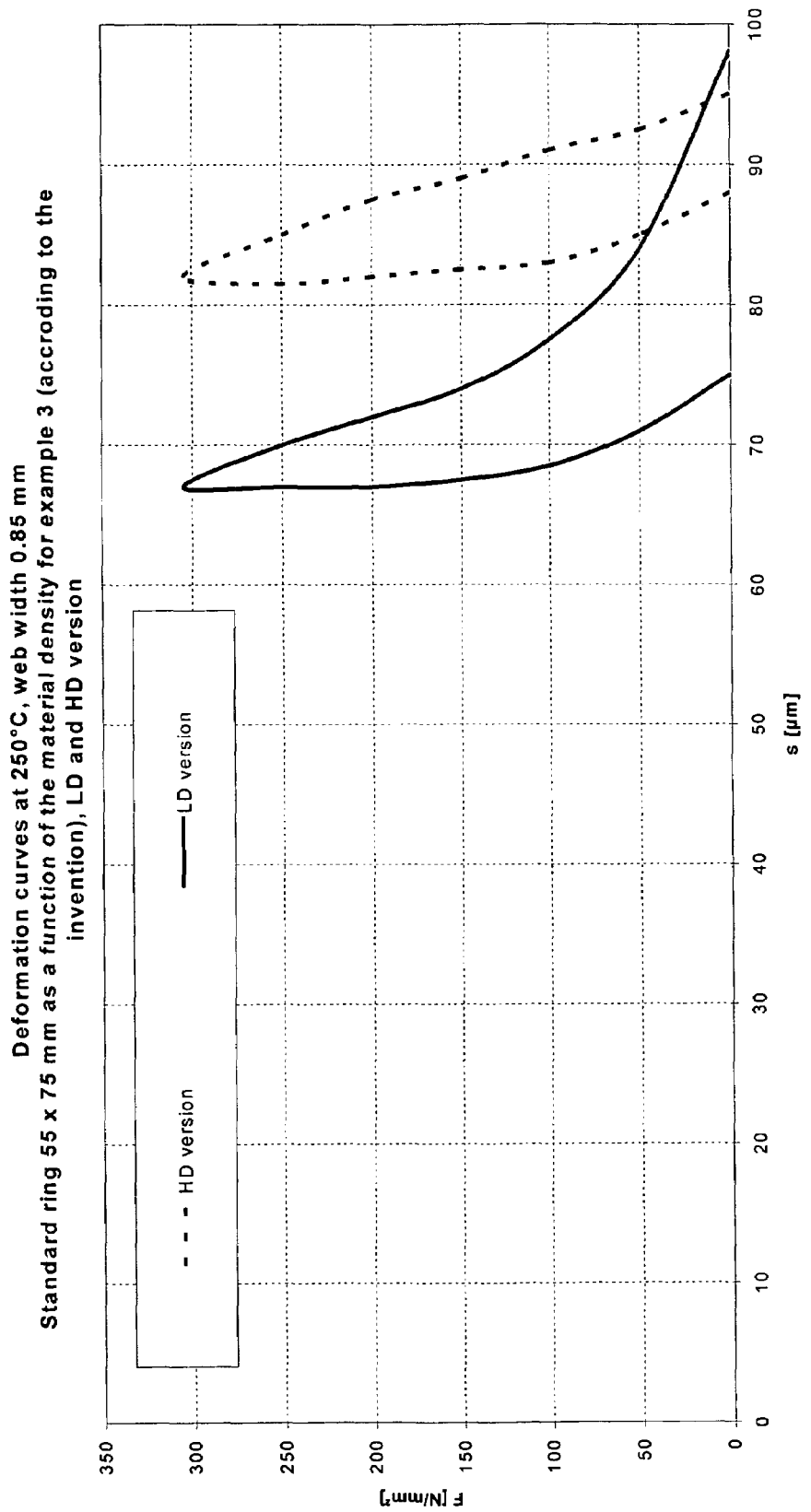
FIG. 18 shows deformation curves, at 250° C. and a web width of 0.85 mm, of composite films according to the invention laminated with steel sheet and the dependence thereof on the material density of the composition of example 3, in each case the HD version and the LD version, by way of example.

FIG. 18 shows deformation curves of the material according to the invention, according to example 3 (according to the invention), for the example of the LD and HD version having different material densities, tested at 250° C. Standard 55×75 mm rings, web widths of 0.75 mm, were tested at 250° C. and the curves obtained in FIG. 18 were found. The materials according to the invention fulfilled the specifications with regard to the adaptability and exhibit the controllability of the adaptability by means of the material density.

Figure 19:
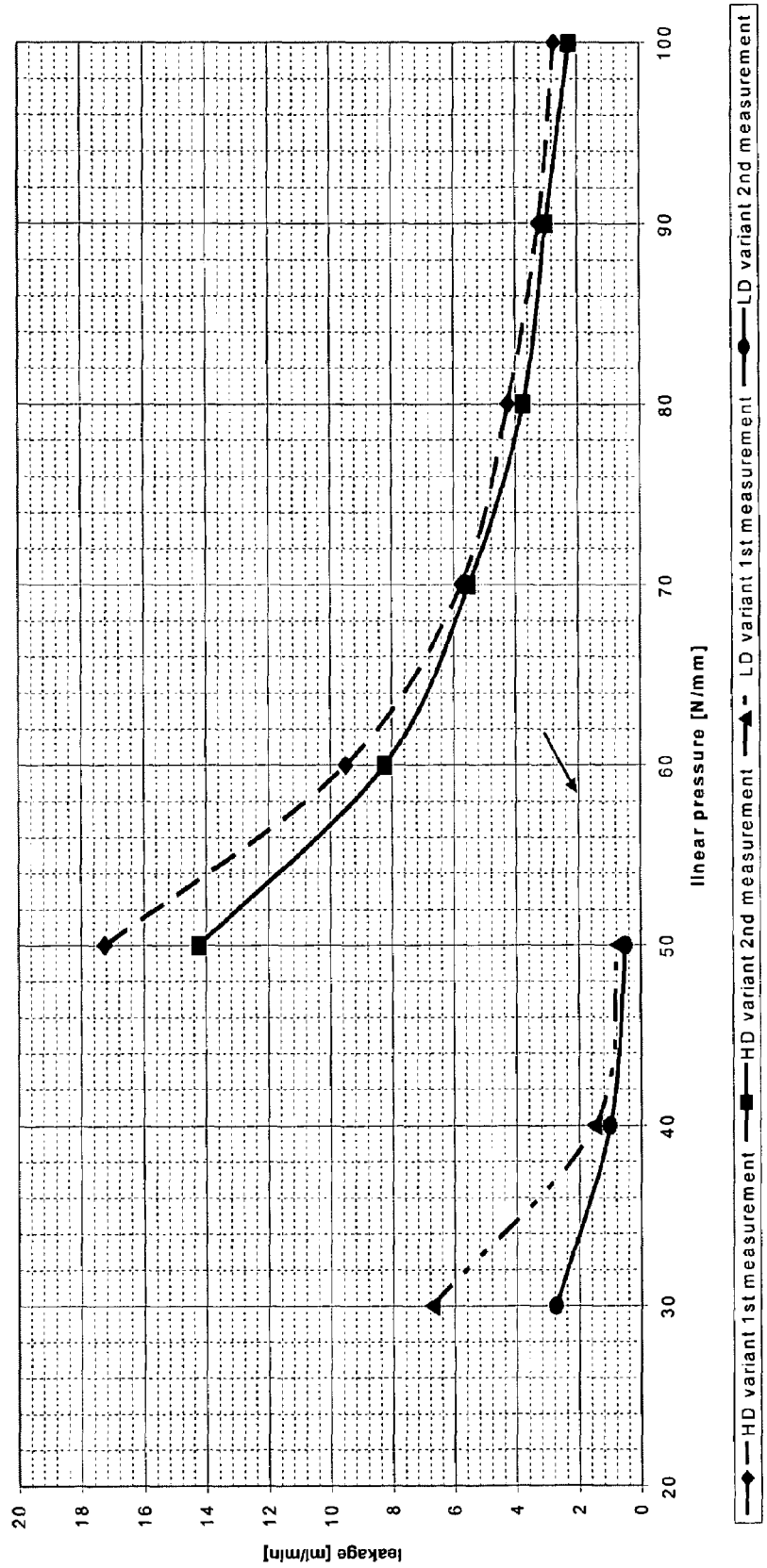
FIG. 19 shows, by way of example, the influencing of the leakage rate by density variation in example 3 according to the invention in the LD version (0.9 g/cm$^3$) and in the HD version (1.4 g/cm$^3$).

FIG. 19 shows the reduction of the leakage rate by density reduction by way of example for example 3 (invention) in the HD and LD version. The samples according to the invention fulfilled the leakage criterion with $N_2$/1 bar at $R_{max}$ 12 μm. The test specimen was once again a standard ring measuring 55×75 mm and having beading.

Examples 1 to 11 (according to the invention): all data in % by weight.

EXAMPLE 1

Production of a Fibre Mat

75% of PEEK
10% of carbon fibres
15% of binder

EXAMPLE 2

Production of a Fibre Mat

75% of PEEK
20% of carbon fibres
5% of binder

EXAMPLE 3

Production of a Fibre Mat

75% of PEEK
20% of polyaramid fibres
5% of binder

EXAMPLE 4

Production of a Fibre Mat

75% of PEEK
10% of carbon fibres
5% of binder
5% of PTFE additive

EXAMPLE 5

Production of a Fibre Mat

75% of PEEK
20% of polyaramid microfibres, i.e fibres having a titre of less than 0.9 dtex
5% of binder

EXAMPLE 6

Production of a Fibre Mat

85% of PEEK
15% of binder (fibrid)

EXAMPLE 7

Production of a Fibre Mat

50% of PEEK
5% of binder
45% of PTFE additive

EXAMPLE 8

Production of a Fibre Mat

60% of PPS (oxidized)
30% of carbon fibres
10% of binder

EXAMPLE 9

Production of a Fibre Mat

70% of polyamide 66 fibres
15% of carbon fibres
15% of PVA binder

EXAMPLE 10

Production of a Fibre Mat 37.5% of PEK $\Big\}$ mixture
27.5% of PEI

5% of binder
20% of polyaramid

In the above examples 1 to 10, masses per unit area of 100 g/m² were established by way of example.

EXAMPLE 11

Production Example for Flat Sealing Material
(According to the Invention)

Consolidated fibre composite materials were produced from the nonwovens according to the above examples 1 to 10:
One-layer pressing:
Pressing temperature: 250° C. to 400° C.
Pressing time: 0.1 to 15 min
Pressure per unit area: 0.3 N/mm² to 15 N/mm²
Resulting thickness: 86-125 μm
Density: 0.8 g/cm³ or 1.45 g/cm³

LIST OF REFERENCE NUMBERS

2 Interface to steel substrate
4 High-performance thermoplastic
6 Additives
8 Carbon fibres
10 Embedding material
12 Pores
14 E-glass reinforcing fibres
16 High-performance thermoplastic
18 Zone of higher density
20 Zone of low density
22, 24, 26 Zones of medium density
30 Sealing layer of high density
31 Steel sheet layer
32 Sealing layer of low density
34 Substrate layer
36 Bead
38 Topography
40 Zone of low resilience
42 Zone of medium resilience
44 Zone of higher resilience
50 Comb profile (offset)
52 Flat seal
54 Comb profile
56 Nonwoven layers
58 Sealing lip
60 Sealing material 62 Edge at sealing space
64 Projected edges
66 Axis of symmetry

The invention claimed is:
1. High-performance flat sealing material wherein:
said material is thermally stable under application conditions up to 330° C.;
said material is a fiber-reinforced and/or binder reinforced composite film having a total layer thickness of from 0.01 mm to 3 mm producible by pressing at least one fiber webs wherein each fibre web of said fiber webs has a weight per unit area of from 8 to 400 g/m²;
wherein said material comprises:
(a) a thermoplastic, selected from the group consisting of polyether ether ketone (PEEK), poly-p-phenylene sulphide (PPS), polyetherimide (PEI), polyetheramide (PEA), polyamide (PA), polysulphone (PSU), polyvinyl ether sulphone (PPSU), polyether sulphone (PES), polyaryl ether ketone (PAEK), polyether ketone (PEK), polyoxymethylene (POM) and mixtures thereof; or from the group consisting of metallic molten fibres having a melting or softening point of the metal fibres of less than 450° C., as molten fibres, in a proportion by weight of from 30 to 97%, based on the total formulation of the fibre web, and having a average fibre length distribution of the molten fibres in the range of from 0.1 mm to 30 mm,
(b) at least one second reinforcing fibre, selected from the group consisting of glass fibres, aramid fibres, carbon fibres, ceramic fibres, oxidised polyphenylene sulphide (PPSO₂) fibres, metal fibres, polyimide fibres, polybenzimidazole fibres, polybenzoxazole fibres and natural fibres and mixtures thereof, the thermal stability of which is greater than that of the molten fibres, in a proportion by weight from 3 to 67%, based on the total formulation of the fibre web, and an average fibre length distribution of reinforcing fibres in the range of from 0.1 mm to 30 mm, with the proviso that the average fibre length distribution of the molten fibres is smaller than that of the reinforcing fibres;
(c) up to 60 percent by weight of a binder based on the total formulation of the fibre web, the components (a), (b) and (c) summing in each case to 100% by weight, and
(d) in addition to 100% by weight of the components (a), (b) and (c), optionally from 0.1 to 80 parts by weight of customary additives and compounding materials, selected from fibres, fibrils, fibrids, nanoscale additives in the size range from 5 to 300 nm, film-like structures, pulps, metallic or ceramic powders, or inorganic hollow microspheres having an average particle size of from 10 to 300 µm and a compressive strength of from 3.5 to 70 MPa and mixtures thereof, fibrid-like additives being preferred, under a pressure of from 0.05 to 15 N/mm² and a temperature of up to 450° C., which is above the melting point or softening point of the molten fibres to give a reinforced composite film having a total layer thickness of 0.01 mm to 3 mm.

2. High-performance flat sealing material thermally stable under application conditions up to 330° C., in the form of a fibre-reinforced and/or binder reinforced composite film, having a total layer thickness of from 0.01 mm to 3 mm, producible by pressing at least one or more fibre webs, comprising the components:
(a) at least one first fibre comprising a thermoplastic, selected from the group consisting of polyether ether ketone (PEEK), poly-p-phenylene sulphide (PPS), polyetherimide (PEI), polyetheramide (PEA), polyamide (PA), polysulphone (PSU), polyvinyl ether sulphone (PPSU), polyether sulphone (PES), polyaryl ether ketone (PAEK), polyether ketone (PEK), polyoxymethylene (POM) and mixtures thereof, or from the group consisting of the metallic molten fibres, as molten fibres, in a proportion by weight of from 30 to 97%, based on the total formulation of the fibre web, and having a average fibre length distribution of the first fibres in the range of from 0.1 mm to 30 mm,
(b) optionally at least one second reinforcing fibre, selected from the group consisting of glass fibres, aramid fibres, carbon fibres, ceramic fibres, oxidised polyphenylene sulphide (PPSO₂) fibres, metal fibres, polyimide fibres, polybenzimidazole fibres, polybenzoxazole fibres and natural fibres and mixtures thereof, the thermal stability of which is greater than that of the molten fibres, in a proportion by weight from 3 to 67%, based on the total formulation of the fibre web, and an average fibre length distribution of reinforcing fibres in the range of from 0.1 mm to 30 mm, with the proviso that the average fibre length distribution of the molten fibres is smaller than that of the reinforcing fibres,
(c) up to 60 percent by weight of a binder based on the total formulation of the fibre web,
the components (a), (b) and (c) summing in each case to 100% by weight, and
(d) in addition to 100% by weight of the components (a), (b) and (c),
under pressure and elevated temperatures to give a reinforced composite film having a total layer thickness of 0.01 mm to 3 mm.

3. Flat sealing material according to claim 2, characterized in that the pressing has been carried out at a pressure of from 0.05 to 15 N/mm² and a temperature of up to 450° C.

4. Flat sealing material according to claim 2, characterized in that the individual fibre webs have a weight per unit areas of from 8 to 400 g/m², in particular of from 50 to 100 g/m².

5. Flat sealing material according to claim 2, characterized in that the molten fibre is selected from the group consisting of PPS, PEI, PEK and PEEK and blends thereof and from the group consisting of the metallic molten fibres.

6. Flat sealing material according to claim 2, characterized in that the binder (c) is fibrous and/or film-like and/or fibrid-like and in particular is a dispersion and contains compounds which are based on polyacrylate, polyvinyl acetate, ethylene/vinyl acetate, polyvinyl alcohol, polyurethanes, polyaramids, (co)polyolefins, resins from the group consisting of melamine resins, phenol resins, polyurethane resins, or mixtures thereof.

7. Flat sealing material according to claim 2, characterized in that the fibre mats additionally contain additives (d) selected from fibres, fibrils, fibrids, nanoscale additives in the size range from 5 to 300 nm, film-like structures, pulps, metallic or ceramic powders, or inorganic hollow microspheres having an average particle size of from 10 to 300 µm and a compressive strength of from 3.5 to 70 MPa and mixtures thereof, fibrid-like additives being preferred.

8. Flat sealing material according to claim 7, characterized in that tribologically active compounding materials known from the prior art, such as PTFE fibres or powders, polyimide fibres, polyaramid fibres or films and/or fibrids, carbon nanofibres or powders, are present as additives in the flat sealing material.

9. Flat sealing material according to claim 2, characterized in that the flat sealing material after pressing or consolidation has a density of from 0.25 g/cm³ to 4 g/cm³, in particular from 0.75 g/cm³ to 1.6 g/cm³.

10. Flat sealing material according to claim 2, characterized in that the molten fibres, the additives and the reinforcing fibres are present in homogeneous distribution in the fibre mat.

11. Flat sealing material according to claim 2, characterized in that it has a specific inhomogeneity in cross-section.

12. Seal, in particular cylinder head gasket, characterized in that it consists of a flat sealing material according to claim 2 applied to at least one sheet-like substrate, in particular a metallic substrate, or a woven fabric or knitted fabric, or paper or a sheet.

13. Seal according to claim 12, characterized in that the flat sealing material is embedded between two substrates, in particular two woven fabric substrates.

14. Seal according to claim 12, characterized in that it consists of a laminate comprising a plurality of flat sealing materials applied to substrates.

15. Seal according to claim 12, characterized in that it has a density varying from place to place or a topographical surface or thickness varying from place to place.

16. Seal according to claim 15, characterized in that the different resilience and plasticity are achieved by topographically designed press plates or partial, sectoral pressing with compression pressures varying from place to place.

17. Seal according to claim 12, characterized in that it has a topographical surface which varies from place to place and has been achieved by means of a top material layer which is adhesively bonded or welded to the seal, in particular is welded by means of laser technology.

18. Seal according to claim 12, characterized in that the different resilience and plasticity have been achieved by different fibre and/or filler content within the sealing surfaces.

19. Seal according to claim 12, characterized in that the different resilience and plasticity are distributed in sectors over the sealing surface and are achieved by mosaic-like assembly of the fibre mats of different resilience and plasticity.

20. Seal according to claim 12, characterized in that the flat sealing material used for the seal has different resilience and plasticity and the seal contains both composite materials, inserted elastomer parts, ceramic materials and metallic materials, such as bead rings, sheet metal rings placed on top or inserted, sheet metal rings without beading, flanged borders or reinforced films which have been welded on or applied by adhesive bonding.

21. Seal according to claim 12, characterized in that additives have been applied in a localised manner to the fibre webs in a separate operation by spraying, gravure printing or screen printing.

22. Seal according to claim 12, characterized in that additives have been applied in a localised manner to the reinforced film in a separate operation by spraying, gravure printing or screen printing.

23. Seal according to claim 12, characterized in that additives have been applied in a localised manner to the seal in a separate operation by spraying, gravure printing or screen printing or by laser technology.

24. Seal according to claim 12, characterized in that the seal has a sealing geometry produced by moulding.

25. Seal according to claim 12, characterized in that the seal has a comb profile for sealing.

26. Seal according to claim 12, characterized in that it contains sensors or transponders which have been incorporated by means of the pressing process.

27. Flat sealing material according to claim 2, comprising from 3 to 10% by weight of said binder based on the total formulation of the fibre web.

28. Flat sealing material according to claim 2 further comprising from 0.1 to 80 parts by weight of customary additives and compounding materials.

\* \* \* \* \*